(12) United States Patent
Bellamkonda et al.

(10) Patent No.: US 11,641,597 B2
(45) Date of Patent: May 2, 2023

(54) SYSTEMS AND METHODS FOR MITIGATING CELLULAR AND TERRESTRIAL CAPTIVE SITE INTERFERENCE

(71) Applicant: Verizon Patent and Licensing Inc., Basking Ridge, NJ (US)

(72) Inventors: Krishna K. Bellamkonda, Flower Mound, TX (US); Jaime Lugo, Boca Raton, FL (US); Alexander Zerzghi, Branchburg, NJ (US); Arvind Kumar, Princeton, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 17/359,760

(22) Filed: Jun. 28, 2021

(65) Prior Publication Data
US 2022/0417784 A1    Dec. 29, 2022

(51) Int. Cl.
*H04W 28/02* (2009.01)
*H04W 52/24* (2009.01)
*H04W 16/32* (2009.01)
*H04B 17/336* (2015.01)
*H04W 24/10* (2009.01)
*H04B 17/391* (2015.01)

(52) U.S. Cl.
CPC ...... *H04W 28/0236* (2013.01); *H04B 17/336* (2015.01); *H04B 17/391* (2015.01); *H04W 16/32* (2013.01); *H04W 24/10* (2013.01); *H04W 52/244* (2013.01)

(58) Field of Classification Search
CPC ..................................... H04B 7/185
See application file for complete search history.

(56) References Cited

U.S. PATENT DOCUMENTS

2005/0260973 A1* 11/2005 van de Groenendaal ........... H04W 12/08 455/411
2006/0019665 A1* 1/2006 Aghvami ............ H04W 52/244 455/444

* cited by examiner

*Primary Examiner* — Sulaiman Nooristany

(57) ABSTRACT

Systems and methods model earth stations and other captive terrestrial sites as simulated cell sites in a radio access network (RAN) to identify potential cellular network interferers with the earth stations. A computing device selects an earth station within a geographic area of a RAN segment and model the earth station as a cell within the RAN segment, wherein the modeling creates a simulated earth station cell. The computing device obtains sector carrier data for cells in the RAN segment and scores, based on the sector carrier data, neighboring cells to the simulated earth station cell. The scoring indicates a level of potential interference of the neighboring cells with the earth station based on geo-spatial relevance. The computing device identifies projected mobility interference in neighboring cells to the earth station and provides prioritization recommendations for interference mitigation for the earth station based on the scoring and the identifying.

20 Claims, 7 Drawing Sheets

SYSTEMS AND METHODS FOR MITIGATING CELLULAR AND TERRESTRIAL CAPTIVE SITE INTERFERENCE

BACKGROUND INFORMATION

Management of a network may relate to a multitude of factors, such as architecture, provisioning, network resource modeling, fault supervision, assurance and performance management, trace management, network density, and other types of network-related factors. For example, ever-increasing demands for wireless services may be addressed through network densification with respect to existing infrastructures, which has led to an increase of radio link interference on both uplink (UL) and downlink (DL) radio interfaces. Network management may include the use of various tools and analytics to identify issues, faults, and other problems.

DETAILED DESCRIPTION OF EXAMPLE EMBODIMENTS

The following detailed description refers to the accompanying drawings. The same reference numbers in different drawings identify the same or similar elements.

Management of a network, such as a large-scale network, may involve understanding the interrelationship between network resources, other structures, and geographic locations. For example, a radio access network (RAN), such as a Fourth Generation (4G) RAN or a Fifth Generation (5G) RAN includes various RAN devices deployed at various geographic locations. Each RAN device (e.g., a base station) typically uses multiple carrier frequencies. For example, a single RAN device may provide coverage over an area referred to as a cell. A cell typically uses multiple carrier frequencies to meet capacity demands and provide guaranteed service quality within each cell, although not all carrier frequencies are typically applied on every cell. A cell may be divided into one or more sectors, with each sector providing different areas of coverage that may overlap. A particular sector may also transmit and/or receive signals on one or more predefined carrier frequencies. A particular carrier frequency in a particular sector may be referred to herein as a "sector carrier."

Figure 1:
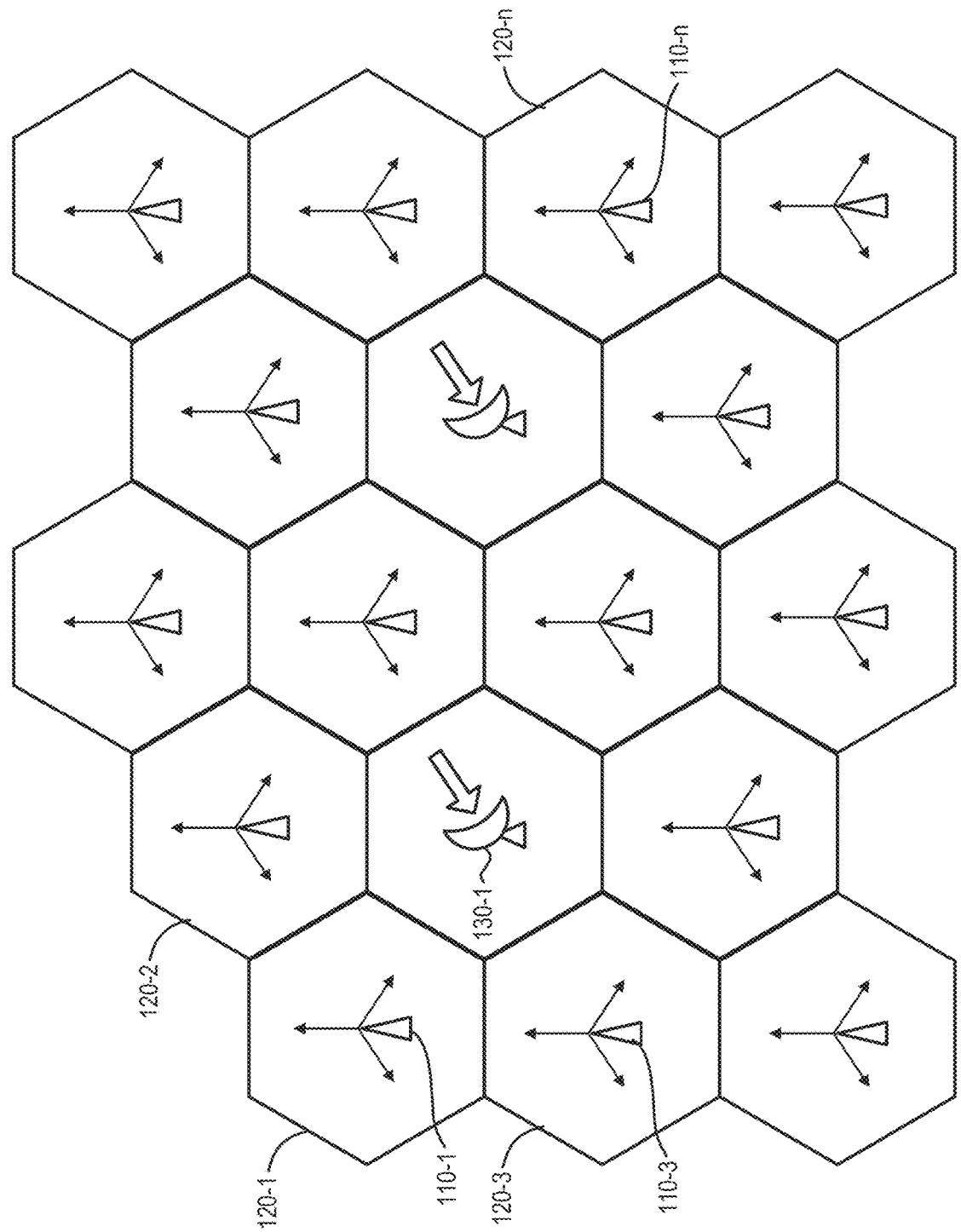
FIG. 1 is a diagram illustrating concepts described herein.

FIG. 1 provides an illustration of concepts described herein. RAN devices 110 (referred to individually as RAN device 110-1, 110-2, . . . 110-n) may define cells 120 (referred to individually as cells 120-1, 120-2, . . . 120-n) which may cover a geographic area of a RAN. High-density cell deployment may give rise to signal interference. As a common example, RF signals used by a first cell (e.g. 120-1) are subject to signal interference from signals of a same frequency/frequency band used in one or more neighboring cells (e.g., cells 120-2, 120-3) with at least partially overlapping coverage areas.

Cells of RAN devices 110 may also cause signal interference with other devices (e.g., non-RAN devices) operating on the same or interfering frequency bands in the geographic area of the RAN. For example, RAN devices 110 may cause interference with earth stations for satellite communications and other captive terrestrial sites (collectively referred to herein as "earth stations 130") that receive signals on the same or interfering bands with RAN devices 110. While government regulations may be imposed for cell placement near earth station 130 boundaries to minimize interference, mobile network operators (MNOs) need to avoid and mitigate interference associated with earth stations 130 regardless of their geographic location relative to earth stations 130.

Earth stations 130 may include ground stations or antennas at the receiving end of a satellite link for satellite communications (e.g., including satellites for low-earth, mid-earth, and high-earth orbits). Earth stations 130 may include permanent installations or ad hoc sites (e.g., temporary stations for emergency use). Since each earth station 130 is typically a receiving (RX)-only station, actual instances of signal interference can only be detected at the earth station. Accurate predictions of signal interference are needed to optimize cell 120 arrangements while avoiding interference with earth stations 130. Thus, one aspect of network management includes identifying potential cellular network interferers (e.g., RAN devices 110) to earth stations 130 that operate in the in interfering bands. Additionally, traffic and mobility in the same frequency band as earth station 130 can cause interference as devices (e.g., drones, autonomous vehicles, etc., not shown) using designated network slices pass near an earth station 130. Thus, another aspect of network management includes anticipating potential mobile traffic that may operate in the same band near earth stations 130.

Systems and methods described herein may model earth stations as cell sites to identify potential cellular network interferers to the earth stations or other captive terrestrial sites which operate in the same band or in interfering bands. For fixed RAN devices, the ambient direction of the interference at the earth station is quantified based on geo-spatial characteristics. Mobility of end devices between the cells with high levels of interference may also be identified to reduce potential impacts. According to an implementation, a computing device may select an earth station within a geographic area of a RAN segment and model the earth station as a cell within the RAN segment. The modeling creates a simulated earth station cell or mock cell (referred to herein as an "earth station cell") that can be integrated into a model with other RAN cells. The computing device may obtain sector carrier data for cells in the RAN segment and may score, based on the sector carrier data, cells neighboring the earth station cell. The scoring indicates a level of potential interference of the neighboring cells with the earth station based on geo-spatial relevance. The computing device may identify projected mobility interference in neighboring cells to the earth station and provide, based on the scoring and the identifying, prioritization recommendations for interference mitigation for the earth station.

Figure 2:
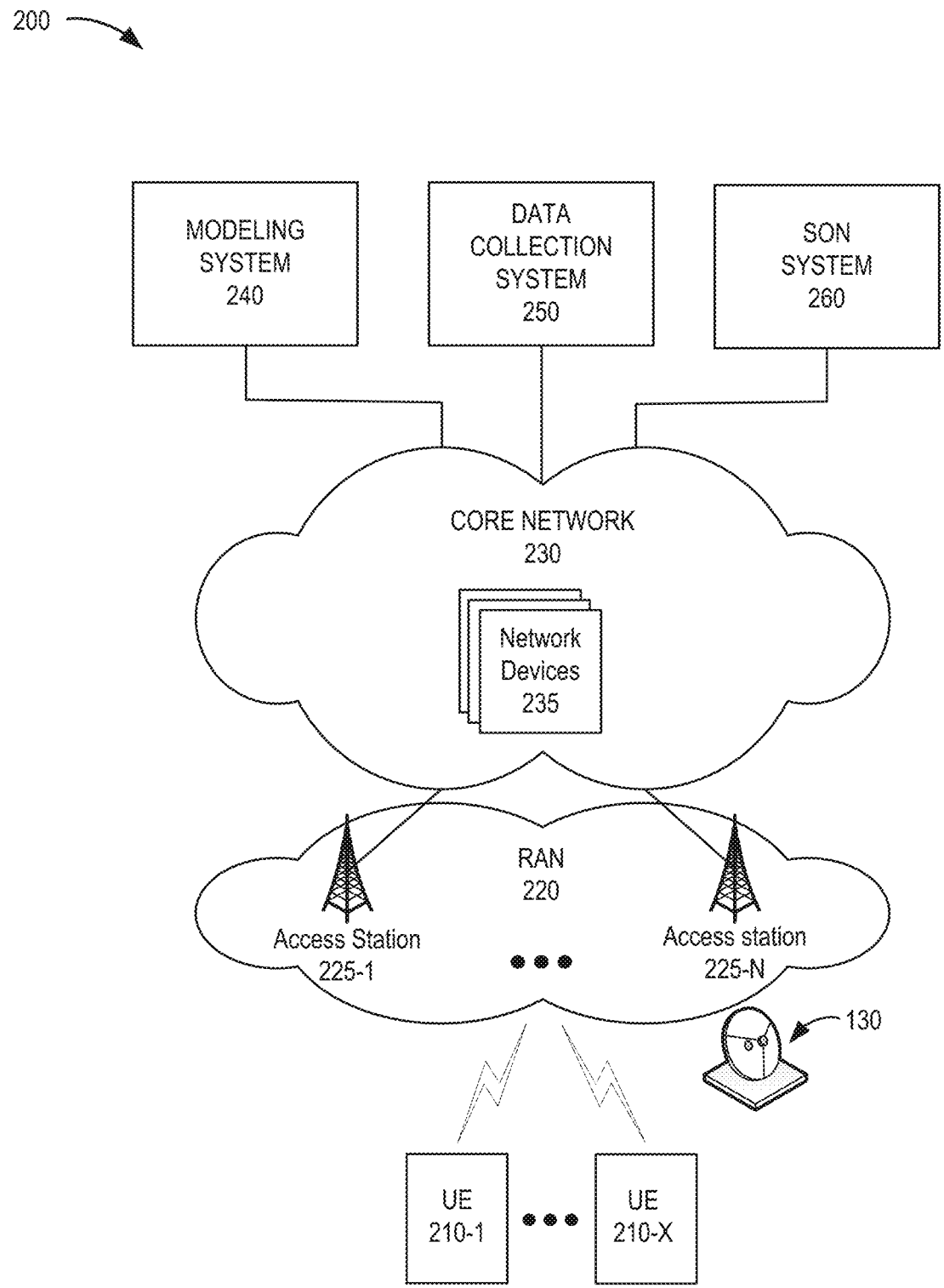
FIG. 2 is a diagram illustrating a network environment according to an implementation described herein.

FIG. 2 is a diagram of an exemplary environment 200 in which the systems and/or methods, described herein, may be implemented. As shown in FIG. 2, environment 200 may include user equipment (UE) devices 210-1 to 210-X (referred to herein collectively as "UE devices 210" and individually as "UE device 210"), a radio access network (RAN)220, a core network 230, a modeling system 240, a data collection system 250, and a SON system 260.

UE device 210 may include any device with long-range (e.g., cellular or mobile wireless network) wireless communication functionality. For example, UE device 210 may include an Unmanned Aerial Vehicle (UAV), an autonomous terrestrial vehicle, or another high-power mobile device. In another implementation, UE devices 210 may include a handheld wireless communication device (e.g., a mobile phone, a smart phone, a tablet device, etc.); a wearable computer device (e.g., a wristwatch computer device, etc.); a portable computer; a customer premises equipment (CPE) device, such as a set-top box or a digital media player, a WiFi access point, a smart television, etc.; a mobile device; a portable gaming system; global positioning system (GPS) device; a home appliance device; a home monitoring device; and/or any other type of computer device with wireless communication capabilities. UE device 210 may include capabilities for voice communication, mobile broadband services (e.g., video streaming, real-time gaming, premium Internet access etc.), best effort data traffic delivery, and/or other types of capabilities. In some implementations, UE device 210 may communicate using machine-to-machine (M2M) communication, such as machine-type communication (MTC), and/or another type of M2M communication.

RAN 220 may enable UE devices 210 to connect to core network 230 for mobile telephone service, text message services. Internet access, cloud computing, and/or other types of data services. RAN 220 may include one or multiple networks of one or multiple types and technologies. For example, RAN 220 may include a Fifth Generation (5G) RAN, a Fourth Generation (4G) RAN, a 4.5G RAN, and/or another type of future generation RAN. By way of further example, RAN 220 may be implemented to include a Next Generation (NG) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN).

RAN 220 may include radio access stations 225-1 to 225-N (referred to herein collectively as "access stations 225" and individually as "access station 225"). Access station 225 may include one or more devices and other components that allow UE devices 210 to wirelessly connect to RAN 220. Access stations 225 may correspond, for example, to RAN devices 110 of FIG. 1. Each access station 225 may service a set of UE devices 210. For example, access station 225-1 may service some UE devices 210 when the UE devices 210 are located within the geographic area serviced by access station 225-1, while other UE devices 210 may be serviced by another access station 225 when the UE devices 210 are located within the geographic area serviced by the other access station 225.

Depending on the implementation, RAN 220 may include one or multiple types of access stations 225. For example, access station 225 may include an evolved Node B (eNB), an evolved Long Term Evolution (eLTE) eNB, a next generation Node B (gNB), a radio network controller (RNC), a remote radio head (RRH), a baseband unit (BBU), a small cell node (e.g., a picocell device, a femtocell device, a microcell device, a home eNB, a repeater, etc.), a base station, or another type of wireless node. Access stations 225 may connect to core network 230 via backhaul links, such as wired or optical links. According to various embodiments, RAN 220 may be implemented according to various wireless technologies (e.g., radio access technology (RAT), etc.), wireless standards, wireless frequencies/bands, and so forth.

In some embodiments, access station 225 may include a one or more radio frequency (RF) transceivers facing particular directions. For example, access station 225 may include three RF transceivers and each RF transceiver may service a 220-degree sector of a 360-degree field of view. Each RF transceiver may include an antenna array. The antenna array may include an array of controllable antenna elements configured to send and receive RF signals via one or more antenna beams. The antenna elements may be mechanically or digitally controllable to tilt, or adjust the orientation of, an antenna beam in a vertical direction and/or horizontal direction.

Core network 230 may manage communication sessions for UE devices 210. Core network 230 may provide mobility management, session management, authentication, and packet transport, to support UE device 210 and access station 225 wireless communications using, for example, a dual connectivity and/or multi-RAT configuration. Core network 230 may be compatible with known wireless standards which may include, for example, 3GPP 5G, LTE, LTE Advanced, Global System for Mobile Communications (GSM), Universal Mobile Telecommunications System (UMTS), IS-2000, etc. Some or all of core network 230 may be managed by a communication services provider that also manages RAN 220 and/or UE device 210. Core network 230 may allow the delivery of Internet Protocol (IP) services to UE device 210 and may interface with other external networks. Core network 230 may include one or more server devices and/or network devices, or other types of computation or communication devices (referred to collectively as network devices 235).

Modeling system 240 may include one or more devices, such as computer devices and/or server devices, which perform modeling of RAN cells and simulated earth station cells (e.g., for earth stations 130). For example, modeling system 240 may include a collaborative framework that models an earth station 130 as another cell 120 in RAN 220. Modeling system 240 may include one or more trained machine learning models to convert location data for access stations 225 and earth stations 130 into geo-spatial coordinates. Modeling system 240 may further identify distances between access stations and assign morphology categories (e.g., indicating an estimated effective signal propagation based on topography and building/structure density) for each sector carrier to determine potential interfering carrier frequencies. In some aspects, modeling system 240 may filter the group of potential neighbor carrier frequencies based on sector carrier directions. Modeling system 240 is described further, for example, in connection with FIG. 3.

Data collection system 250 may collect and store network data for RAN 220 and earth stations 130. For example, data collection system 250 may generate records for access stations 225. The records may include location data and identify the configured sector data and corresponding carrier frequencies. Data collection system 250 may also obtain mobility pattern data for UE devices 210 within RAN 220. Data collection system 250 may also collect and store earth station data from one or more sources, such as public filings, direct user input, map data, etc. According to implementations described herein, data collection system 250 may provide the RAN data and earth station data to modeling system 240 for modeling of potential interferences with earth stations 130.

SON system 260 may include one or more devices, such as computer devices and/or server devices, which perform part of self-organization functions for access network 220 and/or core network 230. SON system 260 may obtain information relating to access stations 225 and may perform SON actions to mitigate interference with earth stations 130 based on recommendations/models generated by modeling system 240. For example, SON system 260 may send an instruction to access station 225, such as, for example, an instruction to adjust one or more coverage optimization parameters, adjust one or more power distribution parameters, and/or perform another type of adjustment. SON system 260 may receive prioritized recommendations (e.g., projected interference by a cell or sector carrier) from modeling system 240 and may perform the recommended SON adjustment or solicit authorization to perform the recommended SON adjustment.

Although FIG. 2 shows exemplary components of environment 200, in other implementations, environment 200 may include fewer components, different components, differently arranged components, or additional components than depicted in FIG. 2. Additionally, or alternatively, one or more components of environment 200 may perform functions described as being performed by one or more other components of environment 200.

Figure 3:
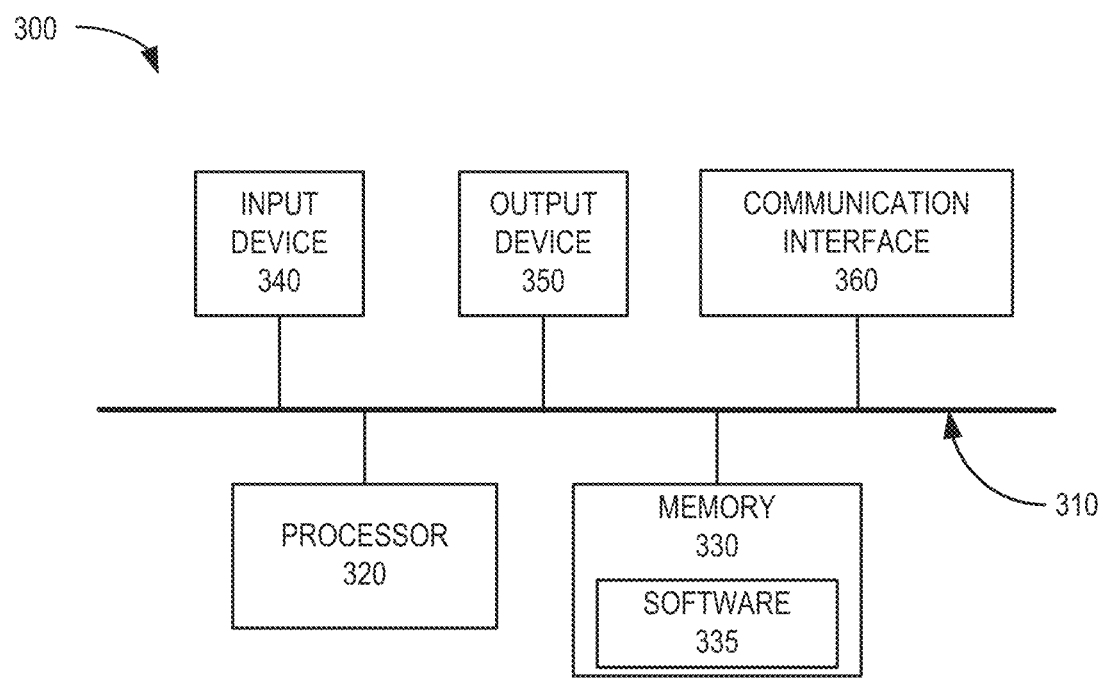
FIG. 3 is a diagram illustrating example components of a device that may be included in a network environment, according to an implementation described herein.

FIG. 3 is a diagram illustrating example components of a device 300 according to an implementation described herein. UE device 210, access station 225, network devices 235, modeling system 240, data collection system 250, SON system 260, and/or other components of network environment 200 may each include one or more devices 300 or may be implemented on one of more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logic) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information (e.g., software 435, data, etc.) for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Software 335 includes an application or a program that provides a function and/or a process. Software 335 may also include firmware, middleware, microcode, hardware description language (HDL), and/or other form of instruction. By way of example, with respect to computing elements that include logic to provide RAN models, these network elements may be implemented to include software 335.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to modeling interferences of earth stations and cell sites. Device 300 may perform these operations in response to processor 320 executing instructions (e.g., software 335) contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
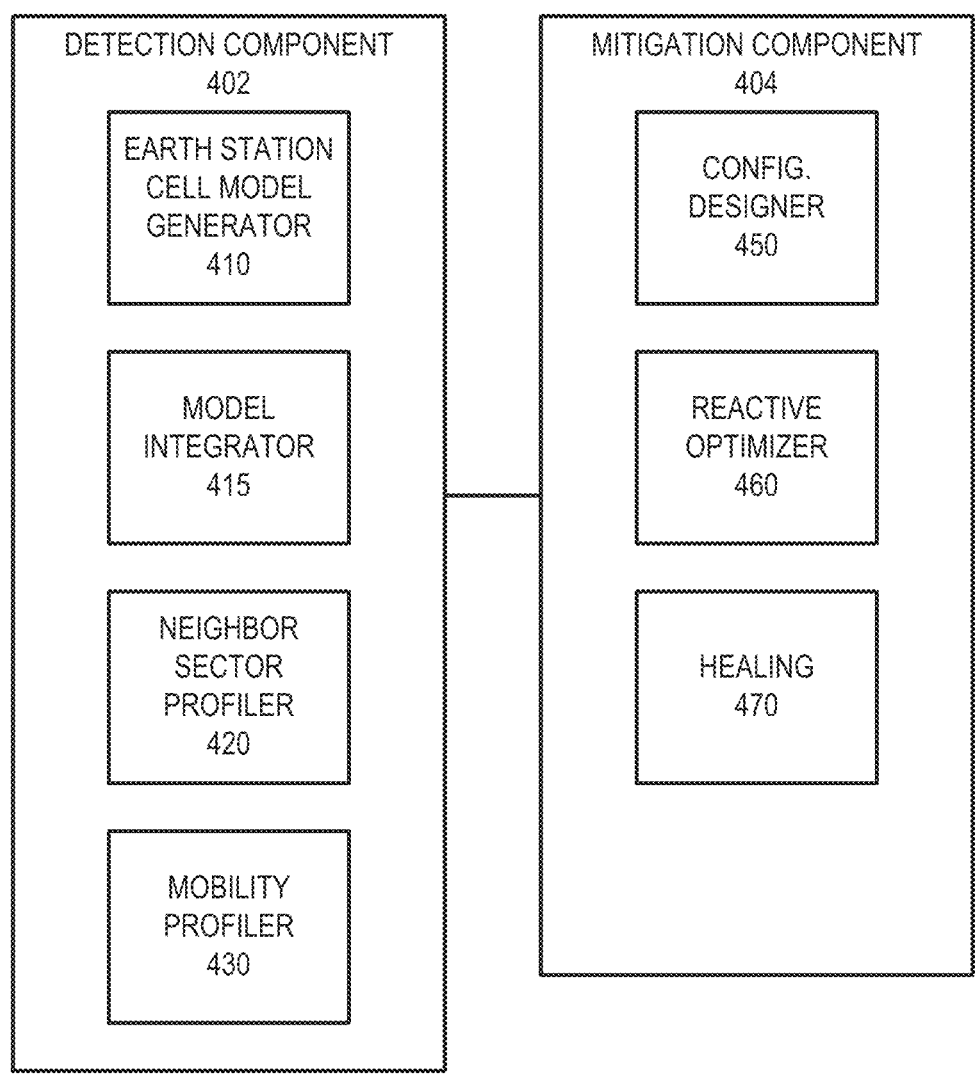
FIG. 4 is a diagram illustrating example logical components of a modeling system, according to an implementation described herein.

FIG. 4 is a diagram illustrating exemplary logical components of modeling system 240. The components of modeling system 240 may be implemented, for example, via processor 320 executing software 435 from memory 330. Alternatively, some or all of the components of modeling system 240 may be implemented via hard-wired circuitry. In some implementations, one or more components of modeling system 240 may include machine learning models, such as, for example, a K-nearest neighbors classifier, a decision tree classifier, a naïve Bayes classifier, a support vector machine (SVM) classifier, tree based (e.g., a random forest) classifier using Euclidian and/or cosine distance methods, and/or another type of classifier.

Figure 5:
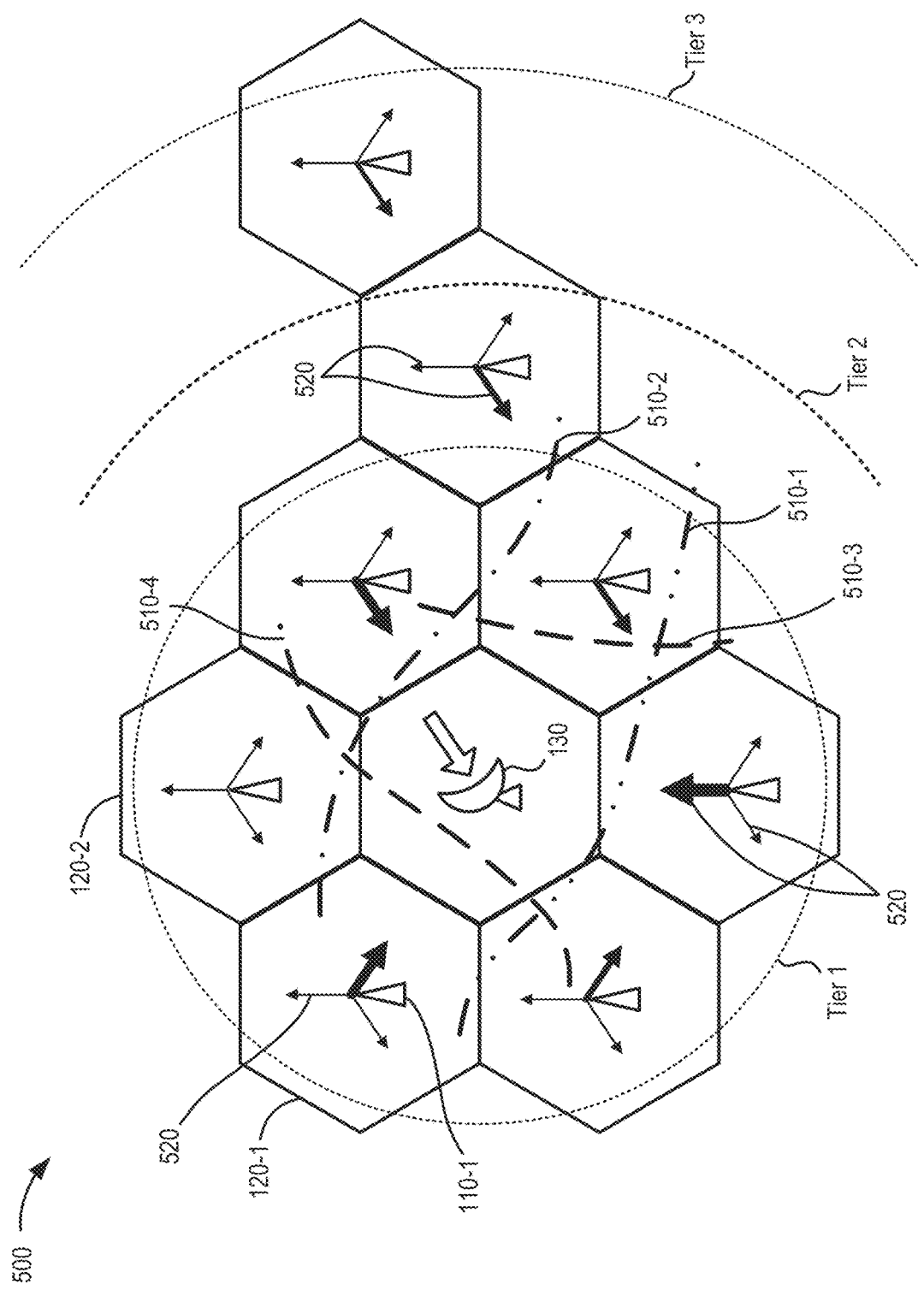
FIG. 5 is a diagram illustrating tiers and projected mobility patterns, according to an implementation.

As shown in FIG. 4, modeling system 240 may include a detection component 402 and a mitigation component 404. FIG. 5 is used below to refer to some aspects of the logical components of modeling system 240. FIG. 5 illustrates tiers and projected mobility patterns among cells in a segment 500 of RAN 220.

Referring to FIG. 4, detection component 402 may build models and apply data to determine slice-aware, captive site interference. As shown in FIG. 4, detection component 402 may include an earth-station cell model generator 410, a model integrator 415, a neighbor sector profiler 420, and a mobility profiler 430.

Earth-station cell model generator 410 may model earth stations 130 as a cell in the wireless network (e.g., RAN 220). According to an implementation, earth-station cell model generator 410 may model earth station 130 receiver sensitivity as a function of transmit power. For example, earth-station cell model generator 410 may simulate a signal transmission capability for earth stations 130 using a maximum transmit power that would be authorized for a corresponding RAN device operating on the same band as earth station 130. Earth-station cell model generator 410 may also model a height of earth station 130 as a function of topography and surrounding building types. According to an implementation, earth-station cell model generator 410 may augment height estimates with building density data from image recognition on terrestrial map data. Additionally, receiver sensitivity of earth station 130 may be modeled as a function of antenna dish size, model type, and a morphology category.

Model integrator 415 may incorporate earth station cells from earth-station cell model generator 410 into a collaborative framework with RAN device cells in the network (e.g., RAN 220). Model integrator 415 may incorporate RAN device cells from existing models (e.g., retrieved from data collection system 250) or generate the RAN device cells. Once an earth station 130 is modeled as a cell in the network, model integrator 415 may identify neighboring sectors of RAN devices 110 that have geo-spatial relevance and high azimuth coupling in respective tiers. According to one implementation, the simulated signal transmission properties of earth station 130 (e.g., from earth-station cell model generator 410) may be used to estimate areas of potential overlap with other RAN device cells (also referred to here as an overlap zone). As shown in FIG. 5, RAN devices 110 (e.g., access stations 225) in an overlap zone 505 may be grouped into tiers based on their relative distances from earth station 130. The distances that define a tier may be based on regulations (e.g., government regulations) corresponding to the earth station. For example, tiers 1 and 2 may reflect threshold distances where signal strength or other limitations on RAN devices 110 are in place. Tier 3 may include RAN devices 110 that are in overlap zone 505 beyond the distances with direct regulations, but which may still be a source of interference for earth station 130.

Neighbor sector profiler 420 may evaluate the neighboring RAN devices 110 and score them based on geo-spatial relevance. The neighbor scoring helps create an ordered list of the neighbors from the full list of the geo-spatial modeling. Geo-spatial relevance can be calculated, for example, using Voronoi polygons and centroid distance. For example, scores based on geo-spatial relevance may be represented as Neighbor_score(abs)=function(centroid_distance_dB+ physical_characteristics_gain_dB). The physical characteristics may be quantified using height, transmit power, tilt values for antennas, etc., for each access station 225. The neighbor scores may then be normalized between output, represented as {earth_station, sector_list[neighbor-x, neighbor-score-x]}. Sectors 520 are illustrated in FIG. 5 as arrows extending from each RAN device 110. The relevance of the geo-spatial scoring models is shown in FIG. 5, with the thickness of different sector arrows 520 showing the relevance of the neighbors in various tiers. According to an implementation, neighbor sector profiler 420 may be configured to provide scoring for different scenarios, such as configuration activities (e.g., planning, site rollouts, etc.), optimization activities (e.g., for handover performance), or healing activities (e.g., compensation for other corrective actions).

Neighbor sector profiler 420 may also evaluate cumulative effects of multiple sectors for interference with an earth station 130. For example, neighbor sector profiler 420 may model cumulative effects of multiple sector carriers from different RAN devices 110 that may collectively contribute to interference for earth station 130, even if the contribution of one sector carrier alone may not register as a significant interferer.

Mobility profiler 430 may perform sector mobility profiling among the neighbors identified by neighbor sector profiler 420. For example, once neighbor sector profiler 420 identifies the neighboring sites with the highest degree of geo-spatial scoring, mobility profiler 430 may identify and notate mobility between neighboring cells in the same band (or interfering frequency bands) as the earth station. For example, as shown in FIG. 5, mobility patterns 510-1, 510-2, 510-3, and 510-4 (collectively referred to as "mobility patterns 510") are illustrated. Mobility profiler 430 may calculate mobility patterns 510 based on actual devices (e.g., UE devices 210) or slices using the cells 120 for intra-frequency mobility. The mobility patterns 510 may be calculated and accounted for because the traffic and mobility of UE devices 210 (e.g., high-power UE devices, such as UAVs or autonomous vehicles, or groups of other devices) in the same band as earth station 130 can cause interference as the UE devices 210 pass next to earth station 130.

Mobility profiler 430 may determine mobility patterns of subscribers (e.g., UE devices 210) around earth stations 130 from call traces applied to the potential overlap zone 505 in tiers 1, 2, or 3. As noted above, the overlap zone 505 may be emulated by modeling earth station 130 as a transmitting RAN device (e.g., access station). Mobility profiler 430 may assess the mobility and degree of mobility for relevant UE devices 210 around earth station 130 in overlap zone 505 with a high level of granularity based on, for example, records indicating the geolocation of UE devices, the network slices used, and/or the device types. The geolocation may indicate, for example, location/time patterns when a UE device is present in overlap zone 505. The network slice used may indicate, among other information, a class of traffic and frequency band for a communication session of the UE device. The device type may indicate, for example, if a UE device is a high-power device (e.g., a UAV, autonomous vehicle, etc.) that is more likely to cause signal interference. Mobility profiler 430 may assign scores and weights to mobility patterns 510 based on the subscriber geolocation, network slice, and/or device type. Mobility profiler 430 may evaluate cumulative mobility patterns which could arise from all the UE devices 210 around earth station 130 and in overlap zones 505 with an existing RAN or growing (e.g., projected) RAN. According to an implementation, the output for mobility profiler 430 may be represented as [sector-mobility-group{neighbor-i, neighbor-j, total-score(i,j), relation weight}].

Still referring to FIG. 4, mitigation component 404 may provide design input to prevent interference with new or existing network configurations and provide solutions for adapting to potential interference due to user mobility. As shown in FIG. 4, mitigation component 404 may include a configuration designer 450, a reactive optimizer 460, and a healing adjuster 470.

Configuration designer 450 may perform proactive configuration for fixed site deployments and also the antenna sub-system used. For example, configuration designer 450 may apply scoring results of existing and proposed sites from neighbor sector profiler 420 to evaluate interferences with earth stations 130 in the geo-spatial framework. Additionally, or alternatively, configuration designer 450 may ensure projected mobility patterns 510 in overlap zone 505 are directed away from the frequency band and/or harmonics that could cause interference with earth station 130. Configuration designer 450 may provide prioritization recommendations (e.g., to SON system 260) for interference mitigation for the earth station. For example, configuration designer 450 may recommend traffic steering to another frequency band or reducing carrier aggregation with the removal of a particular frequency band.

Reactive optimizer 460 may perform reactive optimization for existing sites and workarounds needed to mitigate outgoing interference. For example, reactive optimizer 460 may apply scoring results of existing sites from neighbor sector profiler 420 and mobility profiler 430 (e.g., mobility patterns 510) to evaluate projected interferences with earth stations 130 due to UE device mobility in the geo-spatial framework. According to an implementation, reactive optimizer 460 may, for example, switch potentially interfering UE devices 210 (e.g., a UAV or self-driving vehicle) to a different frequency band that would not interfere with a local earth station 130.

Healing adjuster 470 may perform healing for sites undergoing mitigation. For example, healing adjuster 470 may evaluate coverage impacts for sites based on changes initiated by reactive optimizer 460.

Figure 6:
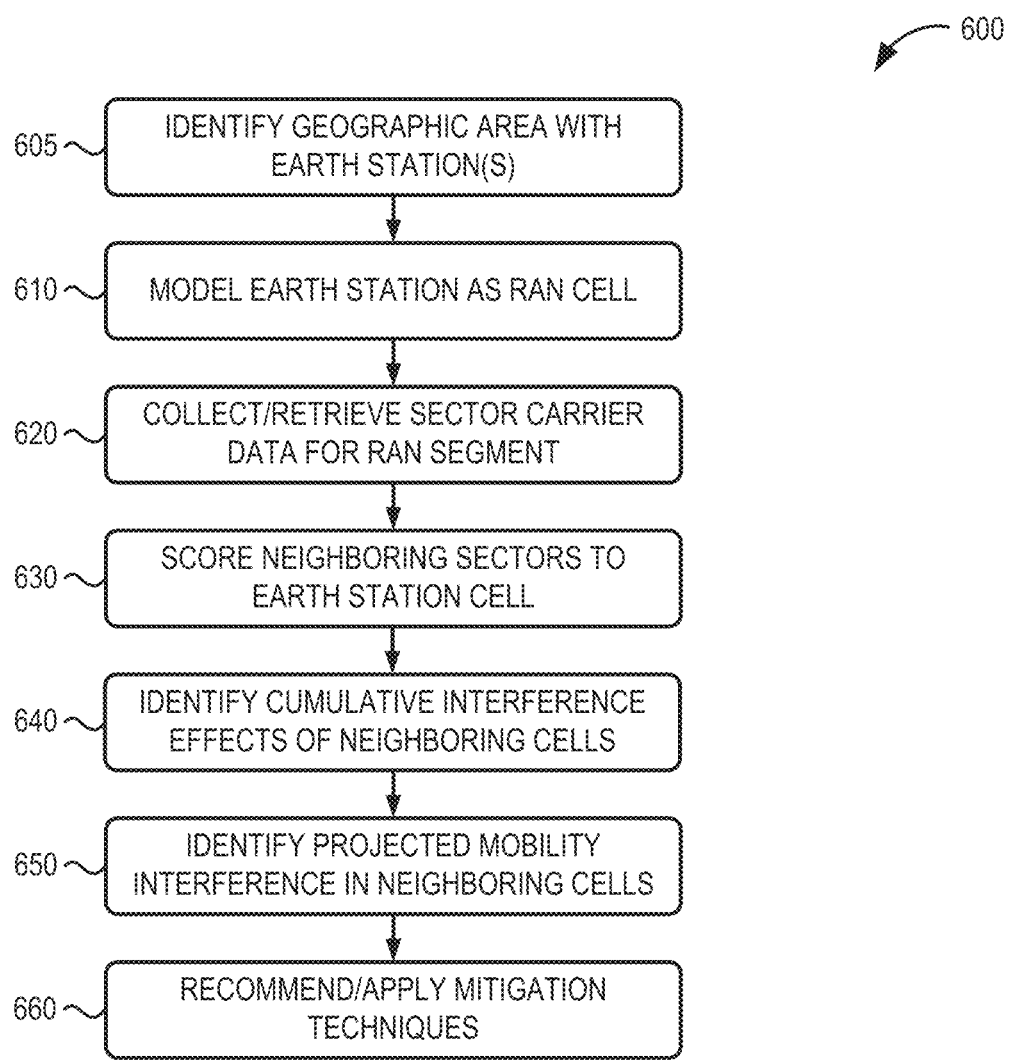
FIGS. 6 and 7 are flow diagrams illustrating an exemplary process for identifying and mitigating terrestrial captive site interference, according to an implementation described herein.

FIG. 6 is a flow diagram illustrating an exemplary process 800 for identifying and mitigating terrestrial captive site interference, according to an implementation described herein. In one implementation, process 600 may be implemented by modeling system 240. In another implementation, process 600 may be implemented by modeling system 240 in conjunction with one or more other network devices in network environment 200.

Process 600 may include identifying a geographic area with one or more earth stations (block 605), modeling earth stations as a RAN cell (block 610), and collecting and/or retrieving sector carrier data for a RAN segment (block 620). For example, modeling system 240 may be provided with a RAN segment data for RAN 220 that includes earth station 130. Modeling system 240 (earth-station cell model generator 410) may model earth station 130 as a cell in RAN 220. Modeling system 240 may collect or retrieve access station data for all or a portion of access stations 225 in RAN 220.

Process 600 may also include identifying and scoring neighboring sectors to the earth station cell (block 630), and identifying cumulative interference effects of neighboring cells (block 640). For example, modeling system 240 (e.g., model integrator 415) may incorporate earth station cells from earth-station cell model generator 410 into a collaborative framework with RAN device cells in the network. Modeling system 240 (e.g., neighbor sector profiler 420) may evaluate the neighboring RAN devices 110 and score them based on geo-spatial relevance. Additionally, neighbor sector profiler 420 may evaluate cumulative effects of multiple sectors 520 for interference with an earth station 130.

Process 600 may further include identifying projected mobility interference in neighboring cells (block 650), and applying mitigation techniques (block 660). For example, modeling system 240 (e.g., mobility profiler 430) may identify and notate mobility between neighboring cells in the same band as the earth station. Mitigation component 404 may provide design input to prevent interference with new or existing network configurations and provide solutions for adapting to potential interference due to user mobility.

Figure 7:
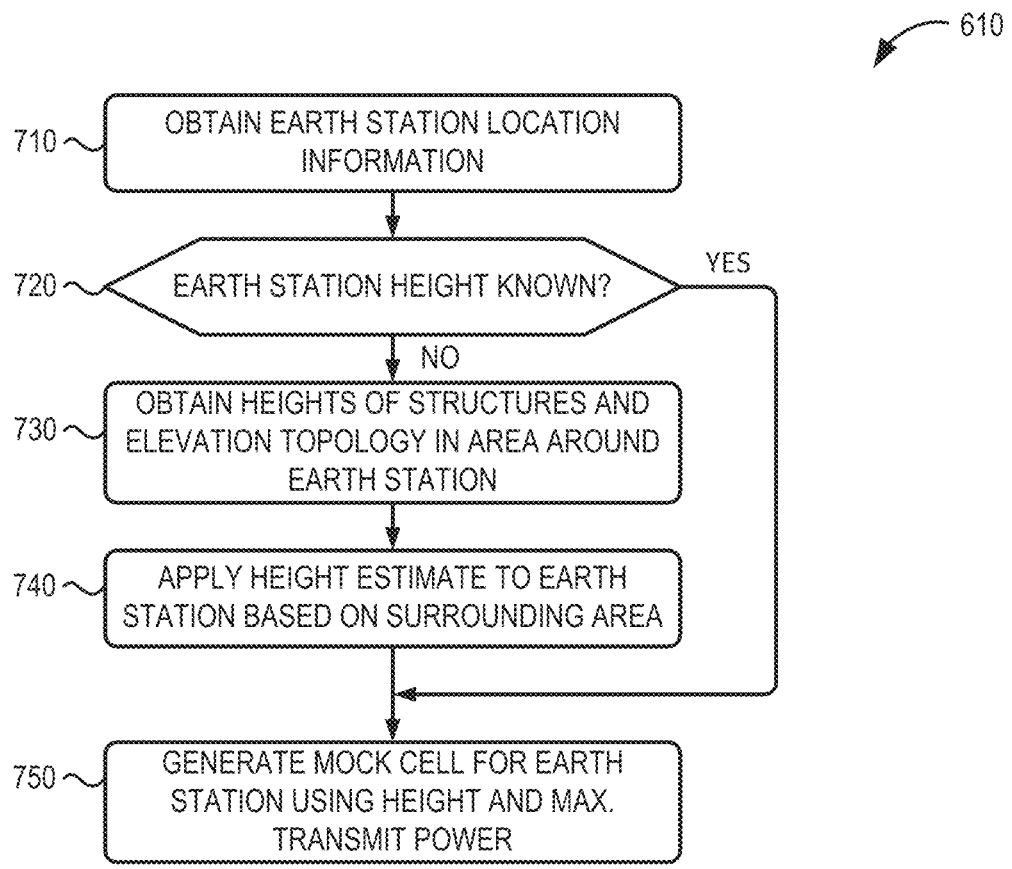

Process block 610 may include blocks described in FIG. 7. As shown in FIG. 7, process block 610 may include obtaining earth station location information (block 710) and determining if the earth station height is known (block 720). For example, earth-station cell model generator 410 may acquire earth station 130 information from public databases and image recognition data obtained from terrestrial maps. Earth-station cell model generator 410 may look for height information for the earth station 130 from the earth station information.

If the earth station height is not known (block 720—No), process block 610 may include obtaining heights of structures and elevation topology in the area around the earth station (block 730), and applying a height estimate to the earth station (block 740). For example, if a height is not provided for earth station 130, earth-station cell model generator 410 may obtain the height of buildings, structures, and above-sea-level elevation topology in the geo-location around earth station 130. According to an implementation, the geo-location around earth station 130 may include a predetermined area having a radius around the earth station. According to one implementation, to estimate the height of earth station 130, earth-station cell model generator 410 may calculate the difference between the 90th percentile height and 10th percentile height of the combined building heights and elevation changes in the geo-location around earth station 130. If the difference between the 90th percentile and 10th percentile of the surrounding structures is higher than a predetermined threshold (e.g., 10 meters, 30 meters, 50 meters, etc.), earth-station cell model generator 410 may assign a height to be equal to about the 20th percentile. If below the threshold, earth-station cell model generator 410 may assign a height of about the 50th percentile. According to other implementation, different percentile values may be used to assign the earth station height. After the height assignment, the process may proceed to block 750.

Referring back to block 720, if the earth station height is known (block 720—Yes) or after applying a height estimate to the earth station, process 610 may include generating a mock cell for the earth station using the known/applied height and a maximum transmit power (block 750). For example, earth-station cell model generator 410 may establish earth station 130 as a mock cell (e.g., an "earth station cell") with the aforementioned height characteristics and use the highest transmit power for the designated frequency band to model the earth station.

As set forth in this description and illustrated by the drawings, reference is made to "an exemplary embodiment," "an embodiment," "embodiments." etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations." etc.

The foregoing description of embodiments provides illustration, but is not intended to be exhaustive or to limit the embodiments to the precise form disclosed. Accordingly, modifications to the embodiments described herein may be possible. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
    selecting, by a computing device, an earth station within a geographic area of a radio access network (RAN) segment, wherein the earth station is a receiving-only antenna at the receiving end of a satellite link;
    generating, by the computing device, a model of the earth station as a cell within the RAN segment, wherein the generating creates a simulated earth station cell based on a location of the earth station, a height of the earth station, and a simulated signal transmission capability of the earth station at a maximum transmit power for a RAN device operating on a frequency band used by the earth station;
    obtaining, by the computing device, sector carrier data for cells in the RAN segment;
    calculating, by the computing device and based on the sector carrier data, scores for neighboring cells relative to the simulated earth station cell, wherein the scores indicate a level of potential interference of the neighboring cells with the earth station based on geo-spatial relevance;
    identifying, based on the model and the scores, cells in the RAN segment having potential signal overlap with the simulated earth station cell;
    identifying, by the computing device, projected mobility interference in neighboring cells to the earth station; and
    providing, by the computing device, prioritization recommendations for interference mitigation for the earth station based on the identified cells and the projected mobility interference.

2. The method of claim 1, wherein generating the model of the earth station comprises:
    assigning the height for the earth station based on the differences between the heights of structures and the elevation topology in the area around the earth station.

3. The method of claim 1, further comprising:
identifying cumulative interference effects of multiple of the neighboring cells to the earth station.

4. The method of claim 1, wherein the scores are further based on a height of a RAN device and a transmit power of the RAN device for each of the neighboring cells.

5. The method of claim 1, wherein generating a model of the earth station comprises:
assigning simulated signal transmission characteristics to the earth-station.

6. The method of claim 1, further comprising:
assigning, by the computing device and based on distances from the earth station, different tiers of the neighboring cells for the earth station.

7. The method of claim 1, wherein identifying the projected mobility interference further comprises:
identifying mobility patterns of user equipment (UE) devices, wherein the mobility patterns are based on records of UE device locations, network slices used by the UE devices, and a device type of the UE devices.

8. The method of claim 1, further comprising:
applying interference mitigation techniques to one or more of the cells in the RAN segment based on the prioritization recommendations.

9. The method of claim 1, further comprising:
applying interference mitigation techniques to one or more of network slices that use the RAN segment based on the prioritization recommendations.

10. The method of claim 1, wherein the sector carrier data includes location data, a sector azimuth, and a carrier frequency for each sector carrier of each access station within the RAN segment.

11. A computing device, comprising:
a processor configured to:
select an earth station within a geographic area of a radio access network (RAN) segment, wherein the earth station is a receiving-only antenna at the receiving end of a satellite link;
generate a model of the earth station as a cell within the RAN segment, wherein the generating creates a simulated earth station cell based on a location of the earth station, a height of the earth station, and a simulated signal transmission capability of the earth station at a maximum transmit power that would be authorized for a RAN device operating on a frequency band used by the earth station;
obtain sector carrier data for cells in the RAN segment;
calculate, based on the sector carrier data, scores for neighboring cells relative to the simulated earth station cell, wherein the scores indicate a level of potential interference of the neighboring cells with the earth station based on geo-spatial relevance;
identify, based on the model and the scores, cells in the RAN segment having potential signal overlap with the simulated earth station cell;
identify projected mobility interference in neighboring cells to the earth station; and
provide prioritization recommendations for interference mitigation for the earth station based on the identified cells and the projected mobility interference.

12. The computing device of claim 11, wherein, when generating the model of the earth station, the processor is further configured to:
obtain heights of structures and elevation topology in an area around the earth station.

13. The computing device of claim 12, wherein the processor is further configured to:
assign an approximate height of the earth station based on the differences between the heights of the structures and the elevation topology in the area around the earth station.

14. The computing device of claim 11, wherein, when calculating the scores, the processor is further configured to:
calculate the scores further based on a height and a transmit power of a RAN device for each of the neighboring cells.

15. The computing device of claim 11, wherein generating the model of the earth station comprises:
assigning simulated signal transmission characteristics to the earth station.

16. The computing device of claim 11, wherein the processor is further configured to:
assign, based on distances from the earth station, different tiers of the neighboring cells for the earth station.

17. The computing device of claim 16, wherein the processor is further configured to:
identify cumulative interference effects of multiple of the neighboring cells to the earth station, wherein, when the prioritization recommendations are further based on the cumulative interference effects.

18. A non-transitory computer-readable medium storing instructions, which are executable by one or more processors, for:
selecting an earth station within a geographic area of a radio access network (RAN) segment, wherein the earth station is a receiving-only antenna at the receiving end of a satellite link;
generating a model of the earth station as a cell within the RAN segment, wherein the generating creates a simulated earth station cell based on a location of the earth station, a height of the earth station, and a simulated signal transmission capability of the earth station at a maximum transmit power that would be authorized for a RAN device operating on a frequency band used by the earth station;
obtaining sector carrier data for cells in the RAN segment;
calculating, based on the sector carrier data, scores for neighboring cells relative to the simulated earth station cell, wherein the scores indicate a level of potential interference of the neighboring cells with the earth station based on geo-spatial relevance;
identifying, based on the model and the scores, cells in the RAN segment having potential signal overlap with the simulated earth station cell;
identifying projected mobility interference in neighboring cells to the earth station; and
providing prioritization recommendations for interference mitigation for the earth station based on the identified cells and the projected mobility interference.

19. The non-transitory computer-readable medium of claim 18, the instructions for generating the model of the earth station further comprise instructions for:
assigning the height for the earth station based on the differences between the heights of structures and the elevation topology in the area around the earth station.

20. The non-transitory computer-readable medium of claim 18, further comprising instructions for:
identifying cumulative interference effects of multiple of the neighboring cells to the earth station.

* * * * *